US006823331B1

(12) United States Patent
Abu-Hakima

(10) Patent No.: US 6,823,331 B1
(45) Date of Patent: Nov. 23, 2004

(54) CONCEPT IDENTIFICATION SYSTEM AND METHOD FOR USE IN REDUCING AND/OR REPRESENTING TEXT CONTENT OF AN ELECTRONIC DOCUMENT

(75) Inventor: Suhayya Abu-Hakima, Kanata (CA)

(73) Assignee: Entrust Limited, Ottawa (CA)

( * ) Notice: Subject to any disclaimer, the term of this patent is extended or adjusted under 35 U.S.C. 154(b) by 608 days.

(21) Appl. No.: 09/649,028

(22) Filed: Aug. 28, 2000

(51) Int. Cl.[7] ............................ G06F 17/30; G06F 7/00
(52) U.S. Cl. ........................................................ 707/3
(58) Field of Search ..................................... 707/3–6

(56) References Cited

U.S. PATENT DOCUMENTS

| | | | |
|---|---|---|---|
| 4,914,590 A | | 4/1990 | Loatman et al. ............... 704/8 |
| 5,588,009 A | | 12/1996 | Will ............................ 714/749 |
| 5,619,648 A | | 4/1997 | Canale et al. ............... 709/206 |
| 5,635,918 A | | 6/1997 | Tett ............................ 340/7.29 |
| 5,652,789 A | | 7/1997 | Miner et al. ........... 379/201.01 |
| 5,742,905 A | | 4/1998 | Pepe et al. .................. 455/461 |
| 5,774,845 A | | 6/1998 | Ando et al. ................. 704/231 |
| 5,794,050 A | * | 8/1998 | Dahlgren et al. ........... 717/144 |
| 5,802,253 A | | 9/1998 | Gross et al. ................. 706/47 |
| 5,825,759 A | | 10/1998 | Liu ............................ 370/331 |
| 5,960,383 A | | 9/1999 | Fleischer ...................... 704/9 |
| 6,061,675 A | * | 5/2000 | Wical .......................... 706/45 |
| 6,137,911 A | * | 10/2000 | Zhilyaev ..................... 382/225 |
| 6,185,592 B1 | * | 2/2001 | Boguraev et al. ........... 715/531 |
| 6,236,987 B1 | * | 5/2001 | Horowitz et al. ............. 707/3 |
| 6,442,545 B1 | * | 8/2002 | Feldman et al. ............. 707/6 |
| 6,470,307 B1 | * | 10/2002 | Turney .......................... 704/9 |
| 6,499,021 B1 | * | 12/2002 | Abu-Hakima .............. 706/10 |

FOREIGN PATENT DOCUMENTS

| | | | |
|---|---|---|---|
| CA | 2236623 | 12/1998 | .......... G06F/17/30 |
| CA | 2192502 | 12/1999 | ........... H04M/3/50 |
| WO | WO 01/53984 A2 * | 7/2001 | .......... G06F/17/30 |
| WO | WO 02/19155 A2 * | 3/2002 | .......... G06F/17/30 |

OTHER PUBLICATIONS

Paice, C.D. and P.A. Jones "The Identification of Important Concepts in Highly Structured Technical Papers", Proceedings of the 16th Annual International ACM–SIGIR Conference on Research and Development in Information Retrieval, pp. 69–78, Jun. 1993.*

Lindberg, D.A.B., B.L. Humphreys and A.T. McCray "The Unified Medical Language System", Journal of Methods of Information in Medicine, vol. 32, No. 4, pp. 281–291, 1993.*

(List continued on next page.)

Primary Examiner—Luke S Wassum
(74) Attorney, Agent, or Firm—Cassan Maclean

(57) ABSTRACT

A concept identification system useful in reducing and/or representing text content of an electronic document and in highlighting the content of the document. A concept knowledge base comprises a plurality of concepts and each concept comprises one or more subconcepts linked to each other and to the concept on a hierarchical basis. One or more of the subconcepts may be linked to one or more subconcepts of another concept. A concept matching module matches text of the document to subconcepts of the concept knowledge base and assesses any links between the matched subconcepts and other concepts and/or subconcepts of the concept knowledge base. From this a determination is made of whether the document relates to a concept of the knowledge base. With an identification of such concept a document representation generator may produce a precis of the document based on a template associated with such concept. For highlighting of a document a highlighter module determines key content of the input document and an interface integrates the concept identification system and the highlighter module. An output module produces an output highlight document from the key content.

12 Claims, 2 Drawing Sheets

OTHER PUBLICATIONS

Riloff, E. and W. Lenhert "Information Extraction as a Basis for High–Precision Text Classification", ACM Transactions on Information Systems, vol. 12, No. 3, pp. 296–333, Jul. 1994.*

McCray, A.T. and S.J. Nelson "The Representation of Meaning in the UMLS", Journal of Methods of Information in Medicine, vol. 34, No. 1–2, pp. 193–201, 1995.*

Kupiec, J., J. Pederson and F. Chen "A Trainable Document Summarizer", Proceeidngs of the 18th Annual International ACM SIGIR Conference on Research and Development in Information Retrieval, pp. 68–73, 1995.*

Cowie, J. and W. Lenhert "Information Extraction", Communications of the ACM, vol. 39, No. 1, pp. 80–91, Jan. 1996.*

Cimino, J.J. "Formal Descriptions and Adaptive Mechanisms for Changes in Controlled Medical Vocabularies", Journal of Methods of Information in Medicine, vol. 35, No. 3, pp. 202–210, 1996.*

Hovy, E. and C–Y. Lin "Automated Text Summarization in SUMMARIST", Proceedings of the ACL97/EACL97 Workshop on Intelligent Scalable Text Summarization, Jul. 1997.*

Cole, R., P. Eklund and B. Groh "Dealing with Large Contexts in Formal Concept Analysis: A Case Study Using Medical Texts" Proceedings of the 2nd International Symposium on Knowledge Retrieval, Use and Storage for Efficiency, 1997.*

Bodenreider, O., S.J. Nelson, W.T. Hole and H.F. Chang "Beyond Synonymy: Exploiting the UMLS Semantics in Mapping Vocabularies", Proceeidngs of the AMIA Annual Symposium, pp. 815–819, Nov. 7–11, 1998.*

Hovy, E. and C–Y Lin "Automated Text Summarization in SUMMARIST", in Advances in Automatic Text Summarization, I. Man and M. Marbury, eds., Cambridge:MIT Press, 1999.*

Oakes, M.P. and C.D. Paice "The Automatic Generation of Templates for Automatic Abstracting", Proceedings of the 21st BCS IRSG Colloquium on IR, 1999.*

Lin, C–Y and E. Hovy "The Automated Acquisition of Topic Signatures for Text Summarization", Proceedings of the 2000 International Conference on Computational Linguistics (COLING 2000), Aug. 1, 2000.*

Bodenreider, O. "Using UMLS Semantics for Classification Purposes", Proceedings of the AMIA Annual Symposium, pp. 86–90 Nov. 4–8, 2000.*

Aronson, A.R. et al. "The NLM Indexing Initiative", Proceedings of the AMIA Annual Symposium, pp. 17–21, Nov. 4–8, 2000.*

Berman, J.J. "Concept–Match Medical Data Scrubbing", Arch Pathol Lab Med, vol. 127, pp. 680–686, Jun. 2003.*

National Library of Medicine, "2003 MeSH Medical Subject Headings", accessed from www.nlm.nih.gov on Aug. 7, 2003.*

*A System for the Seamless Integration of Personal Messaging using Agents Developed on a Lotus Notes Platform*, Ramiro Liscano, Rogert Impey, Paul Gordon, Suhayya Abu–Hakima, undated.

*Automatic Condensation of Electronic Publications by Sentence Selection*, Ronald Brandow, Karl Mitze, and Lisa F. Rau, Information Technology Laboratory, GE Corporate Research and Development, undated.

*A Trainable Document Summarizer*, Julian Kupiec, Jan Pederson and Francine Chen, Xerox Palo Alto Research Centre, undated.

*Development and Evaluation of a Statistically–Based Document Summarization System*, Sung Hyon Myaeng and Dong–Hyun Jang, Department of Computer Science, Chungnam National University, undated.

*New Methods in Automatic Extracting*, H.P. Edmundson, University of Maryland, undated.

* cited by examiner

CONCEPT IDENTIFICATION SYSTEM AND METHOD FOR USE IN REDUCING AND/OR REPRESENTING TEXT CONTENT OF AN ELECTRONIC DOCUMENT

FIELD OF THE INVENTION

The invention pertains to the field of text interpretation, representation and reduction and, more particularly, to a computer system and method for intelligently identifying concept(s) relating to an electronic document and using this knowledge to reduce and/or represent the text content of an electronic document (which may be any type of electronic document including Web pages, electronic messages such as e-mail, converted voice, fax or pager message or other type of electronic document).

BACKGROUND OF THE INVENTION

The volume of information in the form of text, particularly electronic information, being communicated to users is increasing at a very high rate and such information can take many forms such as simple voice or electronic messages to full document attachments such as technical papers, letters, etc. Because of this, there is a growing need in the communications, data base management and related electronic information industries for means to intelligently condense electronic text information for purposes of assisting the user in handling such communications and for effective classification, archiving and retrieval of the information.

The known document condensers (sometimes also referred to as key word/phrase "extractors" or as "summarizers"), which typically function to identify a set of key words/phrases by utilizing various statistical algorithms and/or pre-set rules, have had limited success and limited scope for application. One such known method of condensing text is described in Canadian Patent Application No. 2,236,623 by Turney which was laid open on 23 December, 1998; the Turney method disclosed by this reference relies upon the use of a preliminary teaching procedure in which a number of pre-set teaching modules, directed to different document categories or academic fields, are provided and a selected one is run prior to using the text condenser in order to revise and tune a set of rules used by the condenser so as to produce the best results for documents of a selected category or within the selected academic field.

However, such prior condensers do not advance the art appreciably because they are primarily statistically based and do not meaningfully address semantic or global linguistic factors which might affect or govern the document text. As such they generally produce only lengthy sets or strings of key words and phrases per se and the relationships or concepts between those key words and phrases is often lost in the resulting summary. The prior condensers also ignore the intent of the electronic document and, hence, treat news, articles, discussions, journal papers, etc. generically.

In the applicant's co-pending U.S. application Ser. No. 09/494,312 filed on 21 January, 2000, which is incorporated herein by reference, there is disclosed a computer-readable system for intelligently analyzing and highlighting key words/phrases, key sentences and/or key components of an electronic document by recognizing and utilizing the context of both the electronic document and the user. In accordance with that system a document map is created by removing from the input document the white space (i.e. formatting such as line spacing), designated first stage "exclude" words, which may be defined as conjunctive words (i.e. such as the words "and", "with", "but", "to", "however", etc.), articles (i.e. such as the words "the", "a", "an", etc.), forms and tenses of the words "to have" and "to be" and other filler words such as "thanks", "THX" "bye" etc., and then the text is stemmed by removing suffixes from applicable words to produce the root thereof (lower case letters only and without punctuation). For example, the words "computational" and "computer" would both be stemmed to the same root viz. "comput". The document map preserves the sentence and paragraph structure of the document and includes stem maps and a frequency count designation is assigned to each stem such that it provides a complete list of all word/phrase stems with a frequency count per stem and sentence demarcation (a phrase being a preselected number of consecutive words containing no punctuation or exclude words).

The negation key phrases of the document map are identified using a negation words list and by determining whether the word "not" is in any form (e.g. as "n't" in the words "couldn't", "shouldn't", "wouldn't", "won't", etc.) present in a phrase. These negation key phrases are flagged and given a weight for purposes of scoring them. The action key phrases of the document map are identified using a verbs list and they are scored on the basis of assigned context weights and conditions. The remaining words/phrases of the document are scored in the manner described in the aforementioned Canadian patent application No. 2,236,623 to Turney but with the important improvement of making use of context determinations of the system which identify "include/exclude" words/phrases. In addition, sentences are scored whereby sentences in a document having a higher number of highly ranked words/phrases are themselves, as a whole, given a relatively high ranking.

The inventor herein has discovered that the interpretation and summarization of the text of an electronic document is improved by determining the concept(s) to which the text relate(s) and, in appropriate cases, utilizing this knowledge of the governing concept to produce a representation of the text content rather than a simple summarization or condensed extract thereof.

SUMMARY OF THE INVENTION

In accordance with the invention there is provided a computer-readable concept identification system and for use in reducing and/or representing text content of an electronic document. A concept knowledge base includes a plurality of concepts wherein each concept comprises one or more subconcepts linked to each other and to such concept on a hierarchical basis and wherein one or more of the subconcepts may be linked to one or more subconcepts of another concept. A concept matching module matches text of the document to subconcepts of the concept knowledge base and assesses any links between the matched subconcepts and other concepts and/or subconcepts of the concept knowledge base. From this a determination is made whether the document relates to a concept of the knowledge base. The subconcepts preferably include synonyms therefore.

A document representation generator may be provided for producing a precis of the document based on a template associated with the determined concept. An output module is provided for communicating an identification of the concept determined by the matching module.

Also in accordance with the invention there is provided a computer-readable system and method for highlighting the content of an electronic document and producing therefrom an electronic output highlight document. A concept identification system is provided according to the foregoing and a highlighter module is provided for determining key content of the input document. The highlighter module includes a comparing module for comparing content of the input document to the subconcepts of the concept knowledge base for the determined concept for purposes of determining the key content. An interface integrates the concept identification system and the highlighter module. An output module produces an output highlight document from the key content.

A document mapping module is preferably provided for producing a static document map of the content of the input document, wherein the highlighter module applies to the static document map weightings derived from determinations made by the comparing module.

DESCRIPTION OF THE DRAWINGS

The present invention is described in detail below with reference to the following.

DETAILED DESCRIPTION OF A PREFERRED EMBODIMENT

A concept knowledge base is provided for the concept identification system of the present invention and this knowledge base is used to collectively assess words/phrases contained in an electronic document in order to more intelligently interpret the document. The system is preferably configured as a subsystem of a highlighter system, such as the inventor's above-described highlighter system of application Ser. No. 09/494,312, and also assists in identifying the context of the document.

Figure 1:
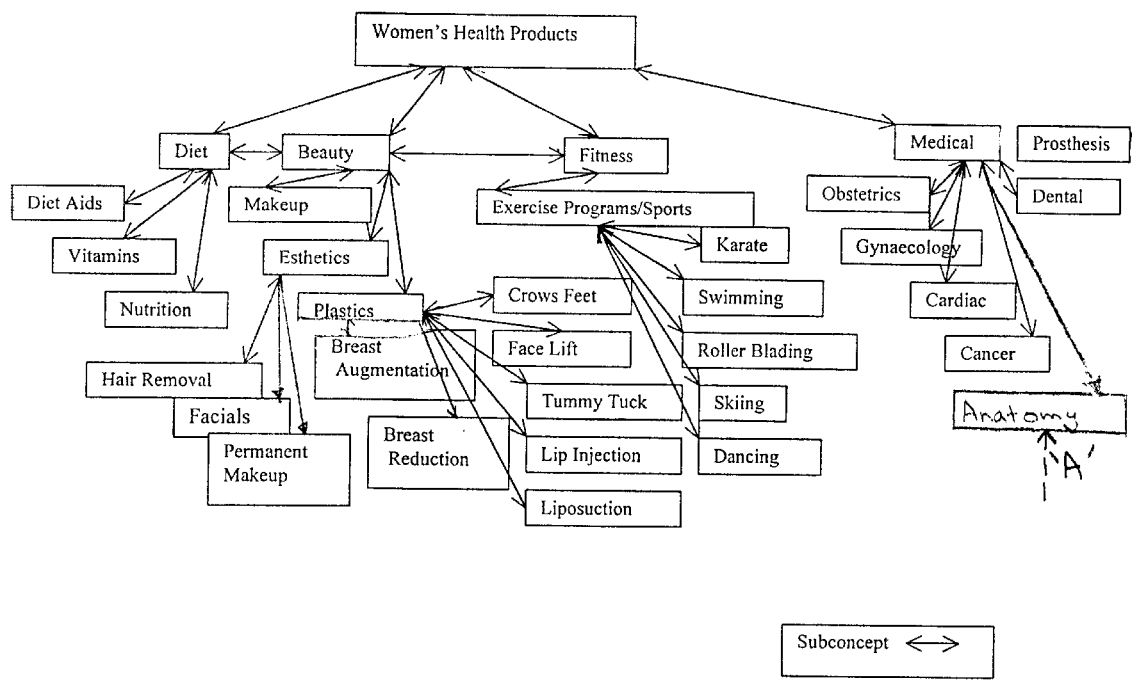
FIG. 1 is a block diagram showing a sample concept network structured in accordance with the invention; and, FIG. 2 is a block diagram showing another sample concept network in accordance with the invention, for a different concept than that of FIG. 1.
Figure 2:
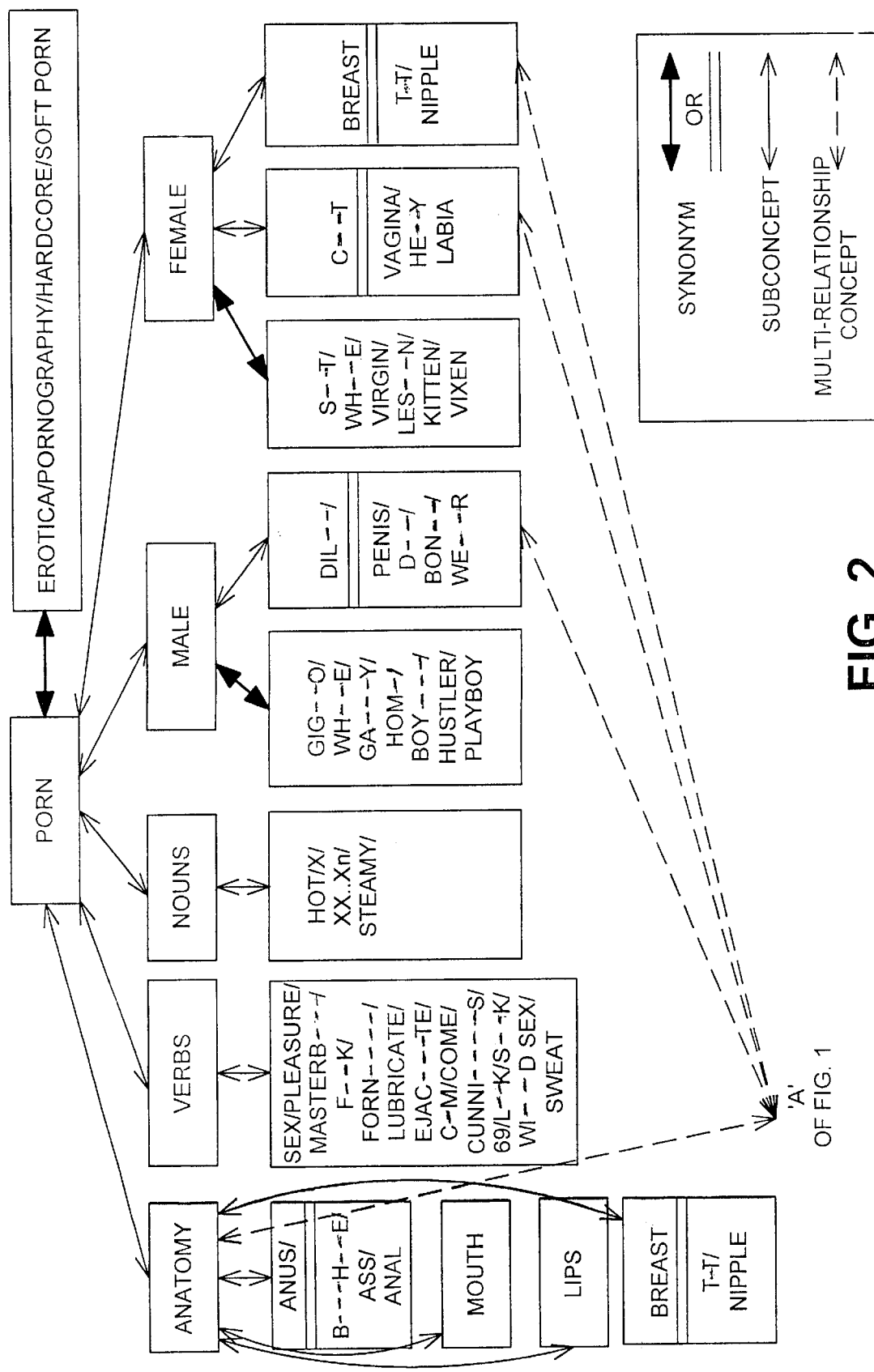

The concept knowledge base of the present system is a database comprised of concept data, referred to herein as concept networks, examples of which are illustrated FIGS. 1 and 2. As will be noted from these, each concept is comprised of one or more subconcepts and the subconcepts may be linked to other subconcepts either within the same concept or within a different concept, the latter types of linkages being referred to as multi-relationship concepts. These linkages within the concept knowledge base enable a more effective assessment of the text of the document to be made by the system and this is done by ranking and counting words/phrases of the document with reference to the information provided by the concept knowledge base.

FIG. 1 shows a sample concept network, namely the concept "women's health products", of a concept knowledge base and FIG. 2 shows another sample concept network, namely, the concept "porn". With reference to FIGS. 1 and 2, the subconcepts of one concept are shown in a box (or boxes) and this box (or these boxes) is (or are) linked to the concept and to each other on a hierarchical basis by normal solid lines. Synonyms for each individual concept or subconcept are shown in boxes linked to that concept or subconcept by bold solid lines and the system treats all words of the concept/subconcept box and its linked synonyms equally (for simplicity and clarity of illustration, these synonyms are shown in FIG. 2 only but they are similarly provided for the exemplary concept of FIG. 1 and all other concepts to be selected and created for inclusion in the concept knowledge base).

Subconcepts may be linked to other subconcepts and in the examples of FIGS. 1 and 2 these linkages of one subconcept to another subconcept are shown by dotted lines. As shown in the example of this provided by FIGS. 1 and 2, the subconcept "anatomy" appears under each of the concepts "Women's Health Products" (FIG. 1) and "Porn" (FIG. 2) and is linked both internally within the concept "Porn" to subconcepts falling under each of the subconcepts "male" and "female" and externally to the concept "Women's Health Products", whereby the subconcept "anatomy" provides a linkage between the concepts "Women's Health Products" and "Porno". The presence of this linkage is recognized by the system on finding, for example, the word "breast" in a document and the system uses this knowledge to initially associate a level of uncertainty with that word for purposes of assigning to it a weighting for scoring purposes to highlight (i.e. summarize) the document. Although the presence of this word in the document could indicate that the document relates to the concept "porn" the document might instead relate to the very different concept of "Women's Health Products". Similarly, words such as "come", "lick" and "suck" may, individually, be of no particular significance in any given document but when found in combination with other subconcept words of the "porn" concept it may be correct that the system identify the document as relating to the "porn" concept.

This contrasts with the known document summarizing systems which use statistical and/or fixed rule means of assessing such text. For example, if the words of a document pertaining to a woman's health issue were to be assessed by an "include/exclude" rule-based system such a system might decide that some words of the document, for example the word "breast", or the document as a whole, are to be given no weight based on an incorrect assessment that the document pertains to pornography (e.g. such as where the user has directed that pornographic words/phrases or documents be excluded).

By using a concept basis for assessing the text, however, the system is able to recognize that the document, as whole, pertains to the concept of woman's health, not pornography, and with this knowledge the system determines an appropriate weighting for the word "breast" in the context of this document. In this example, when the system first encounters the word "breast" and the document has not yet been determined to relate to a particular concept, the system assigns an uncertain status to the word and delays assigning to it a weighting until it has been determined from other text content that the document relates to a particular concept. If the document is determined to relate to the women's health products concept the word "breast" may be given a high weighting but if the concept is pornography the system may instead assign a low weighting to the word.

Each concept is a subject, topic, issue or the like which is structured in the present system as a set of frames according to the following schema (template) and may be illustrated as a network of terms, synonyms and linkages according to the examples of FIGS. 1 and 2:

---

General Schema of a Concept

ConceptName: Name of the concept (CN)
ConceptNameSynonyms: Terms which also represent concept
SubconceptsLevel1: Terms including synonyms that represent subconcepts, listed as triplets of the form
[(CN, SC1(synonyms1):names1(synonyms1)),
(CN, SC2(synonyms2):names2(synonyms2)), . . . ,
(CN, SCn(synonymsn):namesn(synonymsn)]

-continued

General Schema of a Concept

...

SubconceptsLevelz: Terms including synonyms that represent
subconcepts, listed as triplets of the following form which
link to the preceding level
[(SC(z-1), SC1(synomyms1):names1(synomyms1)),
(SC(z-1), SC2(synonyms2):names2(synonyms2)), . . . ,
(SC(z-1), SCn(synomymsn):namesn(synomymsn))]

Note: SC(z-1) would be CN in the case where only one subconcept layer exists i.e. where z=1

For example, this schema is populated as follows for the concept network illustrated in FIG. 2:
ConceptName: Porn
ConceptNameSynonyms: erotica; pornography; hardcore; soft porn
SubconceptsLevel1:
   (Porn, Anatomy: anus (b---h--e; a--; anal); mouth (lips); breast (t-t; nipple))
   (Porn, Verbs: sex; pleasure; masturb---; f--k; forn-----; lubricate; e------te; c-m; come; cun--------s; 69; l--k; s--k; wi---d sex; sweat)
   (Porn, Nouns: hot; X; XX . . . Xn; steamy;
   (Porn, Male (gi---o; w--re; ga---y; ho--; boy---; hustler; playboy): dil--(penis; d---; bo---; we---r))
   (Porn, Female (s--t; wh--e; virgin; le----n; kitten; vixen): c--t (vagina; he--y; labia); breast (t-t; nipple))
Note: The dashes shown in the foregoing words are not actually dashes in the embodiment (rather, the actual words in full are used), but are shown here with dashes only for the purpose of avoiding any offense to the reader as the actual words are, as indicated, in the area of pornography.

As will be noted from the foregoing and FIGS. 1 and 2, the term "anatomy" which falls within the schema of both concepts "women's health products" and "porn", provides a link between these two very different subjects and may lead the system to a review of each. In other words, the term "anatomy" functions as a dual search key within the schema of the illustrated system for the purpose of identifying a matching concept. Similarly, the term "breast" may fall under each of the terms "anatomy" in both schema and, thus, the term breast may serve as a dual search key.

A concept matching module of the concept identification module compares sets of key words and/or key phrases and/or key sentence fragments of the document to the content (i.e. the subconcepts and synonyms) of the concept schemas of the concept knowledge base and counts the number of matches of such key words/phrases/fragments to terms of one or more levels of subconcepts (including the synonyms thereof). Optionally, for an embodiment utilizing a document mapping module which also interprets graphics such as images, the interpretation of such graphics and/or images could be included in the comparisons made by the concept matching module. A higher threshold weight is assigned to those key words/phrases/fragments which have relatively higher levels of inherent distinctiveness (i.e. which more directly identify a concept). For example, the term "breast cancer" is assigned a higher threshold weight than either of the terms "breast" and "cancer". The number of matched terms together with their assigned threshold weights are calculated by the matching module and on the basis of this data the matching module calculates an overall matching weight for each concept in the database.

If a concept is found to have more than a predetermined matching weight for a document the matching module determines that the document text is characterized by that concept. The predetermined matching weight assigned to different concepts differs depending upon the nature of the concept. Specifically, concepts which are normally described using distinct terms are assigned a lower matching weight and those which are normally described using ambiguous or non-distinct terms are assigned a higher matching weight. For example, the concept "porn" is normally described using distinct words (e.g. sex, dirty, hot, etc.) and may be assigned a matching weight of 25% whereas the concept "woman's health products" is normally described using a wide variety of ambiguous and non-distinct terms so a matching weight of 75% may be assigned to it.

A single document may comprise text relating to more than one concept (i.e. a multi-concept document) but its primary concept is identified from the overall weights calculated for each concept. For example, this patent specification document comprises text relating to porn, women's health products and technical reference concepts but the overall weights calculated for each concept show that it is primarily a technical reference document. For purposes of illustration an example of a document map, and its associated word stem map, is presented in Table A at the end of this description.

A basic concept knowledge base of concept networks is initially provided within the system. This basic knowledge base is expanded to suit the user over time as the system operates by means of a concept generator. The concept networks are constructed and populated automatically by the concept generator and also through a semi-automated process whereby the user introduces the concept generator to a new concept together with a starting set of subconcepts and the generator accesses and uses a thesaurus database of the system to identify synonyms for the concepts and subconcepts and possibly additional subconcepts with synonyms therefore. The generator compares the new concept to those of the existing concept knowledge base and any common subconcepts located by the generator are identified as linked subconcepts. The concept generator may identify a new concept by identifying that a document relates to a new concept and then refer to a dictionary of terms/phrases and subjects to identify and initially populate the new concept (alternatively, the user may be asked to identify the concept).

Once a document has been determined by the concept matching module to relate to a given concept the system uses this information to process the text according to predetermined algorithms and/or rules which may be user specified and/or conformed to user preferences. One such algorithm (which depends upon the particular concept identified and any user directions associated with that concept) produces a representation of the document as detailed below. Summarizing algorithms are instead applied where a highlighter system (such as that detailed in the Applicant's said co-pending U.S. application Ser. No. 09/494,312) is integrated with the concept identification system through an interface module, whereby the highlighter system uses the subconcept and synonym information of the identified concept network to improve the highlighter system's assignment of weightings to other words of the document for purposes of generating a highlight summary of the document as detailed in said co-pending U.S. application.

Identification of a concept by the system in association with a document enables the system to perform a number of important applications. Specifically, with this knowledge the system is able to, optionally, generate a precis summary of the text of the document. For example, if the document were to be identified by the system as relating to the concept "meeting" it may be directed to generate a standardised precis of the document by searching for words (i.e. word stems) in the document and using located words to fill in fields of a "meeting template" retrieved from storage by the system. The template fields include the objective, the place, the time period, the date and the invitees of the meeting. A sample completed meeting precis is: "This text is about a staff hiring meeting to be held on Friday, May 30, 2000 in conference room 101 between 1:30 and 3:00 pm for all managers." The system thereby substitutes standardized terms for terms of the document to form a precis text that is much clearer for the user than would be produced by simply extracting the key components of thee text (for example, a pure key word extraction might read "staff hiring problems . . . managers meet . . . 101 conference . . . next Tuesday for 1.5 hours at 1:30. . . be there. square.") Similarly, the system may, optionally, generate a precise sentence summary of the document such that a number of terms of the document are excluded. A sample of this is: "This is a porn email inviting you to view female anatomy for a credit card fee." Excluding many of the terms from the document in this manner can be especially advantageous where the document is to be forwarded or transmitted to a wireless communications device such as a cell phone having a limited display size.

Identifying the concept to which a document relates further enables the system to sort documents and either automatically delete them if the concept to which they relate has been designated by the user as an "automatic delete" concept or store them by category and/or by a priority level assigned to the category under which the document is determined to fall. As such the system is able to automatically sort incoming documents (texts) into categories which, in turn, are appropriately prioritized such as high priority for work-related categories (e.g. the meeting concept) or low priority for personal interest categories (e.g. women's health products).

For example, the user may specify either directly or through the user's habits in the handling of electronic documents assessed by the system, that health documents are of high interest in which case the system would handle the document according to high priority algorithms and semantic knowledge rather than according to low priority algorithms which may be designated for documents characterized by, say, a pornography concept.

Optionally, the system may be directed by the user to categorize and/or prioritize archived documents.

The terms algorithm, module and component herein are used interchangeably and refer to any set of computer-readable instructions or commands such as in the form of software, without limitation to any specific location or means of operation of the same.

It is to be understood that the specific elements of the text reduction/representation system and method described herein are not intended to limit the invention defined by the appended claims. From the teachings provided herein the invention could be implemented and embodied in any number of alternative computer program embodiments by persons skilled in the art without departing from the claimed invention.

TABLE A

Input Text Document:

Can a woman have accurate mammograms with breast implants?
The presence of breast implants requires a special mammography
technique and increases the technical difficulty of taking and reading
mammograms.

TABLE A-continued

This interference may delay or hinder the early detection of breast cancer
by "hiding" suspicious lesions in the breast on a mammogram.
Further information about breast implants, mammography and detecting
breast cancer may be obtained from the FDA at 1-800-532-4440.
Document Map Therefor:

Sentence
No.:

0: [accurate 19 26 WORD, mammograms 28 37 WORD, breast 44 49 WORD, implants 51 58 WORD, ? 59 59 SENTENCE_ENDING]
1: [presence 67 74 WORD, breast 79 84 WORD, implants 86 93 WORD, requires 95 102 WORD, special 106 112 WORD, mammography 114 124 WORD, technique 126 134 WORD, increases 140 148 WORD, technical 154 162 WORD, taking 178 183 WORD, reading 189 195 WORD, mammograms 197 206 WORD, . 207 207 SENTENCE_ENDING]
2: [interference 214 225 WORD, may 227 229 WORD, delay 231 235 WORD, hinder 240 245 WORD, early 251 255 WORD, detection 257 265 WORD, breast 270 275 WORD, cancer 277 282 WORD, hiding 288 293 WORD, suspicious 296 305 WORD, lesions 307 313 WORD, breast 322 327 WORD, mammogram 334 342 WORD, . 343 343 SENTENCE_ENDING]
3: [information 355 365 WORD, breast 373 378 WORD, implants 380 387 WORD, mammography 393 403 WORD, may 405 407 WORD, obtained 412 419 WORD, FDA 430 432 WORD, 1-800-532-4440 437 450 SEPARATED_DIGITS, . 451 451 SENTENCE_ENDING]

[R(0,3)]
Stems of size 1:
{lesion=1[(2,10,1)], early=1[(2,4,1)], hinder=1[(2,3,1)], taking=1[(1,9,1)], presence=1[(1,0,1)], cancer=1[(2,7,1)], mammography=2(1,5,1), (3,3,1)], hiding=1[(2,8,1)], implant=3[(0,3,1), (1,2,1), (3,2,1)], inform=1[(3,0,1)], accur=1[(0,0,1)], delay=1[(2,2,1)], suspici=1[(2,9,1)], increase=1[(1,7,1)], technique=1[(1,6,1)], interfer=1[(2,0,1)], detect=1[(2,5,1)], special= 1[(1,4,1)], obtain=1[(3,8,1)], mammogram=3[(0,1,1), (1,11,1), (2,12,1)], breast=5[(0,2,1), (1,1,1), (2,6,1), (2,11,1), (3,1,1)], may=2[(2,1,1), (3,4,1)], fda=1[(3,6,1)], reading=1[(1,10,1)], require=1[(1,3,1)], technic=1[(1,8,1)]}
Stems of size 2:
{mammography technique=1[(1,5,2)], special mammography=1[(1,4,2)], breast implant=3[(0,2,2), (1,1,2), (3,1,2)], suspici lesion=1[(2,9,2)], accur mammogram=1[(0,0,2)], early detect=1[(2,4,2)], breast cancer= 2[(2,6,2), (3,5,2)]}
Stems of size 3:
{special mammography technique=1[(1,4,3)]}
Stems of size 4:
{ }
wherein, <word> i, j type indicates that <word> occurs in pixel position i–j of the document and is identified as a "type" word.
<stem> = f [s,p,l] indicates that the word stem occurs with frequency f in the position (s = sentence, p = index in sentence, l = number of words)
Resulting Summary (of Text Document):

presence breast implants requires special mammography technique
increases technical taking reading mammograms . . . interference may
delay hinder early detection breast cancer hiding suspicious lesions
breast mammogram . . . information breast implants mammography
detecting breast cancer may obtained FDA 1-800-532-4440 . . .

What is claimed is:

1. A computer-readable concept identification system including modules executable by said computer's programmable processor for identifying a concept to which an electronic document relates, said concept identification system comprising:

(a) a concept knowledge base comprising a plurality of concept schemas wherein each said concept schema comprises: (i) a concept comprising concept terms, including synonyms, that represent said concept: and (ii) a plurality of subconcepts linked to said concept and/or to each other, on a hierarchical basis, and comprising subconcept terms, including synonyms, that represent said subconcept: and wherein said concept schemas comprise one or more sets of multi-relationship concepts wherein one or more subconcepts of a concept of said multi-relationship concepts of each said set is linked to another concept of said multi-relationship concepts of said set through said hierarchically linked subconcepts and concepts of said multi-relationship concepts of said set; and, (b) a concept matching module configured for:
  (i) comparing key word(s) and/or key phrase(s) and/or key sentence fragment(s) of said document to said concept terms and subconcept terms of said concept schemas and identifying matched terms from said comparing;
  (ii) counting said matched terms to determine a match count;
  (iii) identifying matched multi-relationship concepts from any subconcepts of multi-relationship concepts comprising said matched terms:
  (iv) firstly assigning threshold weights to only those of said matched terms which are not comprised in said matched multi-relationship concepts, wherein said firstly assigned threshold weight assigned to each said matched term is based on a level of inherent distinctiveness of said matched term to said concept of said concept schema comprising said matched term;
  (v) determining which of said multi-relationship concepts is more related to said document on the basis of said firstly assigned threshold weights:
  (vi) secondly assigning threshold weights to said matched key word(s) and/or key phrase(s) and/or key sentence fragment(s) which are matched to terms of subconcepts of said multi-relationship concepts on the basis of said multi-relationship concept determined to be more related to said document:
  (vii) for each said concept schema having said matched terms, calculating an overall matching weight representative of said match count and said assigned threshold weights; and,
  (viii) comparing each said overall matching weight calculated for a concept schema to a predetermined matching weight for that concept schema, and from said comparing, determining whether said document is characterized by the concept of said that concept schema.

2. A computer-readable document interpretation system including modules executable by said computer's programmable processor for highlighting the content of an electronic input document and producing therefrom an electronic output highlight document, said system comprising:
  (a) a concept identification system according to claim 1 for providing said identified concept of said concept knowledge base which characterizes said input document;
  (b) a highlighter module interfaced with said concept identification system and configured for determining key content of said input document, said highlighter module comprising a comparing module for comparing content of said input document to said concept schema for said identified concept and for determining said key content on the basis of said concept terms and subconcept terms including a hierarchical position of said terms, in said concept schema; and,
  (c) an output module configured for producing said output highlight document from said key content.

3. A system according to claim 2 and further comprising a document mapping module configured for producing a static document map of said input document's content, wherein said highlighter module applies to said static document map weightings derived from determinations made by said comparing module.

4. A concept identification system according to claim 1 wherein said secondly assigned threshold weights are predetermined on the basis of whether said concept is normally described by distinctive or non-distinctive words/phrases/sentence fragments.

5. A system according to claim 4 and further comprising a document representation generator for producing a precis of said document based on a template associated with said concept identified to characterize said document.

6. A system according to claim 5 and further comprising an output module for communicating an identification of said concept identified by said matching module to characterize said document.

7. A method for identifying a concept to which an electronic document relates of an electronic document for use in reducing and/or representing text content of said document, said method comprising:
  (a) providing a concept knowledge base comprising a plurality of concept schemas wherein each said concept schema comprises: (i) a concept comprising concept terms. Including synonyms, that represent said concept; and (ii) a plurality of subconcepts linked to said concept and/or to each other, on a hierarchical basis, and comprising subconcept terms, including synonyms, that represent said subconcept: and wherein said concept schemas comprise one or more sets of multi-relationship concepts wherein one or more subconcepts of a concept of said multi-relationship concepts of each said set is linked to another concept of said multi-relationship concepts of said set through said hierarchically linked subconcepts and concepts of said mufti-relationship concepts of said set; and,
  (b) comparing key word(s) and/or key phrase(s) and/or key sentence fragment(s) of said document to said concept terms and subconcept terms of said concept schemas and identifying matched terms from said comparing;
  (c) counting said matched terms to determine a match count;
  (d) identifying matched multi-relationship concepts from any subconcepts of multi-relationship concepts comprising said matched terms;
  (e) firstly assigning threshold weights to only those of said matched terms which are not comprised in said matched multi-relationship concepts, wherein said firstly assigned threshold weight assigned to each said matched term is based on a level of inherent distinctiveness of said matched term to said concept of said concept schema comprising said matched term;
  (f) determining which of said multi-relationship concepts is more related to said document on the basis of said firstly assigned threshold weights;
  (g) secondly assigning threshold weights to said matched key word(s) and/or key phrase(s) and/or key sentence fragment(s) which are matched to terms of subconcepts of said multi-relationship concepts on the basis of said multi-relationship concept determined to be more related to said document:
  (h) for each said concept schema having said matched terms, calculating an overall matching weight representative of said match count and said assigned threshold weights; and,
  (i) comparing each said overall matching weight calculated for a concept schema to a predetermined matching weight for that concept schema, and from said comparing, determining whether said document is characterized by the concept of that concept schema.

8. A method for highlighting the content of an electronic input document and producing therefrom an electronic output highlight document, said method comprising:

(a) identifying a concept of said concept knowledge base which characterizes said input document according to claim 7;

(b) determining key content of said input document including comparing content of said input document to said concept schema for said identified concept and determining said key content on the basis of said concept terms and subconcept terms, including the hierarchical position of said terms, in said concept schema; and, (c) producing said output highlight document from said key content.

9. A method according to claim 8 and further comprising producing a static document map of said input document's content, whereby said step of determining key content includes applying to said static document map weightings derived from said step of comparing content.

10. A method according to claim 7 whereby said secondly assigned threshold weights are predetermined on the basis of whether said concept is normally described by distinctive or non-distinctive words/phrases/sentence fragments.

11. A method according to claim 10 and further comprising producing a precis of said document based on a template associated with said concept identified to characterize said document.

12. A method according to claim 11 and further comprising communicating said concept identified to characterize said document.

* * * * *